United States Patent

[11] 3,554,412

[72] Inventors Naoichi Hayashi;
Nobuhiro Takeuchi; Sakae Sunagawa,
Tokyo, Japan
[21] Appl. No. 840,875
[22] Filed Apr. 14, 1969
[45] Patented Jan. 12, 1971
[73] Assignee Sankyo Co., Ltd
Tokyo, Japan
Division of Ser. No. 622,647, Mar. 13,
1967, Pat. No. 3,501,894.

[54] CAPSULE CHARGING SYSTEM
1 Claim, 14 Drawing Figs.
[52] U.S. Cl............................................. 222/346,
141/144, 141/280, 222/370
[51] Int. Cl............................................. G01f 11/10
[50] Field of Search................................... 141/81,
144, 280; 222/345, 346, 370, 302

[56] References Cited
UNITED STATES PATENTS

| | | | |
|---|---|---|---|
| 1,154,665 | 9/1915 | Small................ | 222/370X |
| 2,144,569 | 1/1939 | Frazier.............. | 222/346X |
| 2,801,774 | 8/1957 | Harkess et al....... | 222/302X |
| 2,815,046 | 12/1957 | McBean et al....... | 222/302X |
| 2,966,285 | 12/1960 | Prickett et al...... | 222/345 |
| 3,042,260 | 7/1962 | Thurlings........... | 222/370X |

*Primary Examiner*—Samuel F. Coleman
*Attorney*—Waters, Roditi, Schwartz and Nissen ABSTRACT: A stationary base supports a rotary disc having trap chambers. A feed trough is superposed upon the disc and is open at the leading end and closed at the trailing end, except for an opening immediately above the disc. An agitator is within the trough. Following the trough in the direction of rotation of the disc is a roller to press excess material into the trap chambers, and a wiper blade to deflect remaining excess material from the surface of the disc out of the path of the trap chambers. Each trap chamber then passes over an aperture in the base, releasing the contents of the trap chamber.

PATENTED JAN 12 1971  3,554,412

PATENTED JAN 12 1971      3,554,412

CAPSULE CHARGING SYSTEM

This application is a division of Ser. No. 622,647 filed Mar. 13, 1967 and now Pat. No. 3,501,894.

This invention relates to a system for filling capsules with contents such as powders, granules or pills. Also the invention relates to a filling device used in such system for subdividing a constant amount of contents.

Conventional technique in filling capsules has been to provide an intermittent operation for the system in such a manner that capsules may be held stationary in turn at stations where the capsules or part thereof need be processed or operated. The intermittent operation results in a low efficiency of the system, since it takes a relatively long time for an empty capsule to be filled for delivery.

Therefore, it is an object of the invention to overcome above disadvantage by providing a system which is adapted for a continuous operation.

According to the invention, there is provided a capsule filling system comprising a stand, a drive mounted on the stand, a pair of upper and lower rotary members horizontally supported by the stand, said rotary members being, in use, continuously rotated by the drive, a plurality of first hollow cylindrical portions secured in the upper rotary member and adapted to retain caps of capsules, a plurality of second hollow cylindrical portions provided in the lower rotary member and adapted to receive bodies of capsules, said first and second cylindrical portions being aligned vertically, a first cam rail arranged to raise or lower said second cylindrical portions, a plurality of suction pipes arranged one in each of the second cylindrical portions and capable of being brought into communication with a pneumatic source, thereby serving to separate the bodies from the caps, a second cam rail for moving said suction pipes vertically in the cylindrical portions, at least one stop operative, at a preset rotational position of the cylindrical portions, to cover upper openings of the first cylindrical portions to thereby hold a cap contained therein against upward motion when a charged body is raised to be unified with and closed by the cap, a chute arranged adjacent said upper rotary member for supplying empty capsules complete with caps to the first cylindrical portions in turn, means arranged in the path of the second cylindrical portions for supplying capsule bodies therein with materials to be filled, and delivery means for taking out filled capsules complete with caps from the cylindrical portions.

These and other objects, features and advantages of the invention will become apparent from the following description with reference to the drawing which schematically shows several embodiments of the invention and wherein:

FIGS. 9a to h are views illustrating sequence of operation of the device from the initial supply of an empty capsule to the delivery of a filled capsule;

FIG. 13a to g are views similar to FIG. 9 and illustrating sequence of operation occurring when the filling station shown in FIG. 10 is used.

Referring to the drawing, particularly in FIGS. 1 and 2, the general arrangement of the capsule filling system will be described first. There is provided a stand 1, at the center of which are horizontally supported a pair of upper and lower rotary members 2 and 3 by a shaft 4 which is continuously rotated by a drive 5 such as an electric motor. Both of the rotary members 2 and 3 have a plurality of holes 6, 7 (FIG. 3) provided therein which are equidistantly spaced apart along the periphery of the rotary members. In each hole 6 there is fixedly mounted a cylindrical portion 8, while each hole 7 movably supports another cylindrical portion 9. The cylindrical portions 8 and 9 are vertically aligned. A chute 10 is arranged vertically above the member 2 and the opening at its lower end lies in a position to register with the opening of the cylindrical portions 8 in turn as the rotary member 2 is rotated. The opening at the upper end of the chute is adapted to be supplied with capsules complete with caps from a suspension frame 11 carrying a number of cylinders 12 containing empty capsules. The suspension frame 11 is rotated 180° when the cylinders 12 on one side are emptied. Preferably the chute 10 has an inner diameter slightly greater than the outer diameter of a capsule so that it normally contains therein capsules lengthwise in close succession. Thus the chute 10 constitutes a capsule supplying station.

Angularly spaced from the capsule supplying station or at an advanced position as viewed in the direction of rotation of the rotary members 2, 3 indicated by an arrow in FIG. 1, there is provided a separation station 13 where the body of a capsule is separated from its cap under the action of suction as will be further described later. Subsequently separated bodies are filled with medicine at a first filling station 14 and their content is closely packed at a packing station 15. A second filling station 16 is arranged ahead of the station 14 fills the space in the body, created by the packing operation, with supplementary supply of medicine. Powders attaching to the rim or outer edge of the body opening are cleaned off at a brushing station 17 before the body passes to a capping station 18 where it is capped to be ready for delivery at 19.

Figure 3:
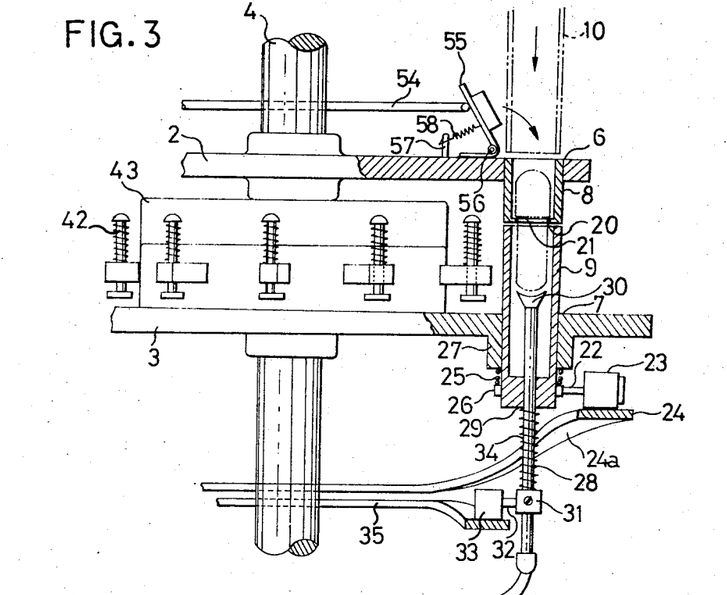
FIG. 3 is a fragmentary front view, partly in section, of a capsule supplying station.

Referring to fig. 3, the cylindrical portion 8 has an inwardly extending, annular detent edge 20 formed at its bottom, and the edge 20 defines an opening 21. The edge 20 and the opening 21 are arranged such that when a capsule complete with its cap comes down through the chute 10 as indicated by an arrow, the cap is interrupted and held by the detent edge 20, while the opening 21 permits the body of the capsule to pass therethrough into a corresponding cylindrical portion 9 provided in the lower rotary member 3. Thus a pair of vertically aligned cylindrical portions 8 and 9 form a support for the capsule. As will be noted from the drawing, the cylindrical portion 8 is fixed in the hole 6 of the rotary member 2 with its upper edge flush with the upper surface of the rotary member 2. However, the cylindrical portion 9 is arranged slidable within the hole 7. To this end, the cylindrical portion 9 has a pivot 22 affixed thereto at its bottom, the pivot 22 carrying a roller 23 at its free end. The roller 23 cooperates with a cam rail 24 which extends below the rotary member 3 generally in an annular shape corresponding to the arrangement of the cylindrical portions. In order to urge the cylindrical portion 9 downward and to thereby press the roller 23 against the cam rail, a compression spring 25 is arranged between a projection 26 of the portion 9 and the edgeface of a sleeve 27 which may be integral with the rotary member 3. Thus when the roller 23 rides on a raised portion 24a of the cam rail, the cylindrical portion 9 is raised to closely approach the upper cylindrical portion 8, as shown in FIG. 3. A suction pipe 28 connected with a pneumatic source (not shown), for example, a vacuum pump, is passed through an opening 29 in the bottom of the cylindrical portion 9 and has an opening 30 at its top, which is shaped like a funnel, thereby serving to receive the bottom of the capsule. The pipe has a fitting 31 fixed thereon to support a pivot 32 which carries a roller 33. A compression spring 34 is arranged between the bottom of the cylindrical portion 9 and the fitting 31 so as to press the roller 33 against a cam rail 35. Thus it will be seen that the position of the pipe 28 inside the cylindrical portion 9 is governed by the configuration of the cam rail 35. Although the rollers 23 and 33 are urged against the cam rails 24 and 35 by the compression springs 25 and 34, respectively, it will be appreciated that these springs may be omitted, if the cam rails are modified to have —shaped profile in which the respective roller fits loosely.

Figures 1, 4:
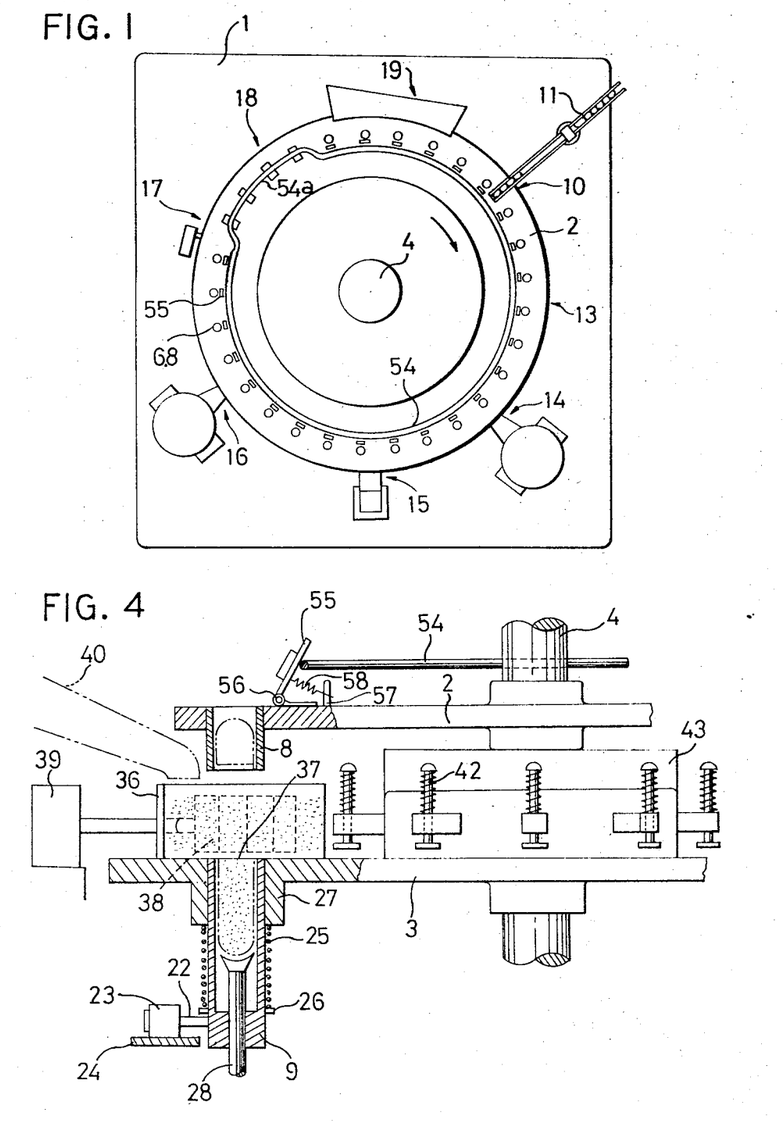
FIG. 1 is a top view of a capsule filling system according to one embodiment of the invention, illustrating the general arrangement of the device in a simplified form.
FIG. 4 is a fragmentary front view, partly in section, of a medicine filling station.
Figure 2:
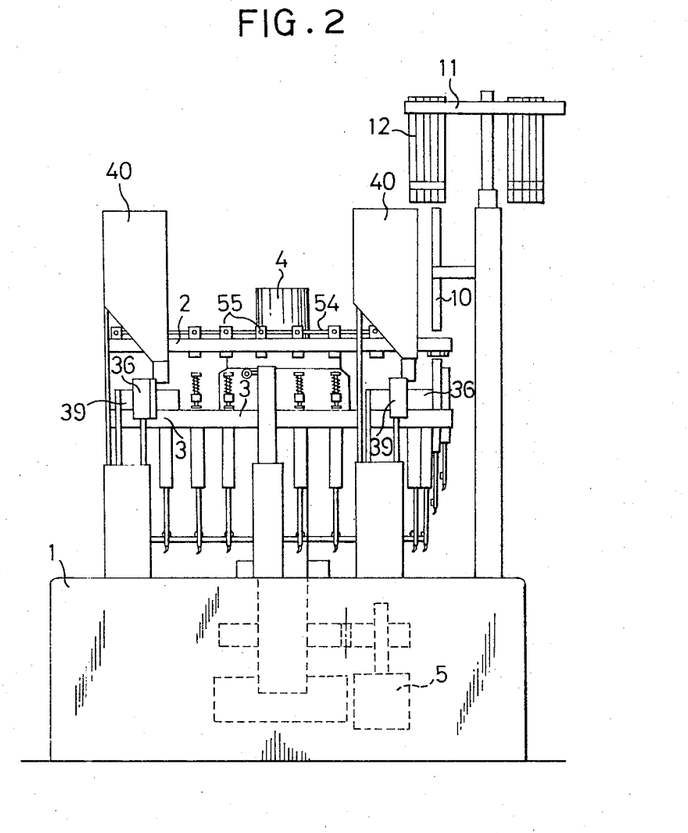
FIG. 2 is an elevational view of the system.

Referring to FIG. 4, the first filling station 14 comprises a feeder 36 arranged in the path of movement of the cylindrical portions 9. The feeder 36 is positioned closely adjacent to the upper surface of the rotary member 9. The feeder 36 has an opening 37 at its bottom, or the bottom may be fully cut out, so that when one of the cylindrical portions 9 comes under the opening, powders in the feeder freely flows into the capsule body received in the cylindrical portion 9. The flow of powders is expedited by the provision of a vibrating plate 38 within the feeder, the plate 38 being driven by a suitable vibrator 39. A hopper 40 is shown in phantom lines which supplies the feeder, through an opening (not shown) at its top, with medicine to be filled into the capsule.

Figure 5:
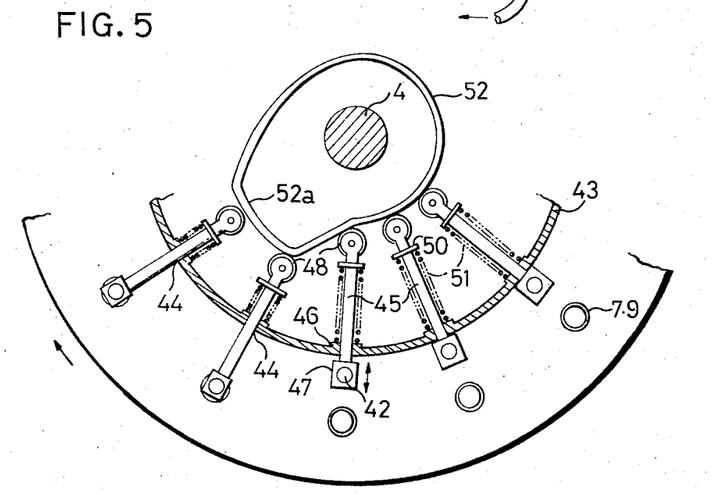
FIG. 5 is a top view of a packing station.
Figure 6:
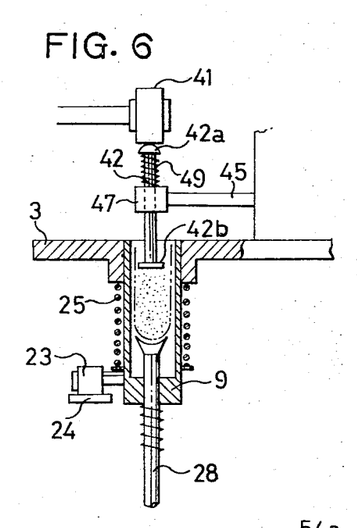
FIG. 6 is an elevation, partly in section, of the packing station shown in FIG. 5.
Figure 7:
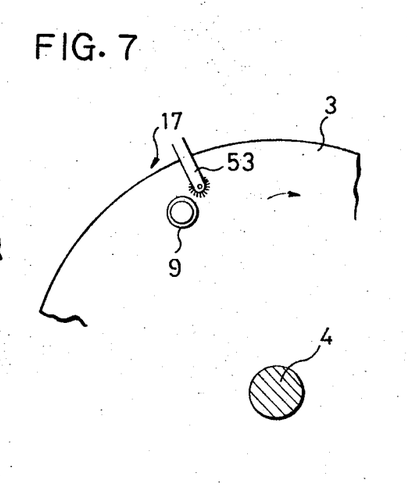
FIG. 7 schematically shows in plan view a brushing station.

Referring to FIGS. 5 and 6, the packing station 15 comprises a stationary roller 41 which is arranged above the path of the cylindrical portion 9 and is adapted to cooperate with a plurality of pushing rods 42 each having a cam follower portion 42a and a flat portion 42b. A circular wall 43 (FIGS. 3 and 5) is mounted on the lower rotary members 3 in concentric relationship with the shaft 4 and has a plurality of equiangularly spaced openings 44 in radial alignment with the holes 7 in the rotary member 3. A rod 45 extends through each opening 44 and is radially constrained by an extension 46. Each rod 45 has a sleeve 47, slidably supporting the pushing rod 42, at its outer end and carries a roller 48 at its inner end. A compression spring 49 is arranged between the portion 42a and the sleeve 47. Adjacent the inner end, the rod 45 is provided with a flange 50 and a compression spring 51 arranged between the flange 50 and the extension 46 urges the roller 48 against a cam ring 52 which is fixedly supported by the stand. Thus the rods 45 are normally in a retracted position, but when the roller 48 rides on an outwardly protecting portion 52a of the cam ring as the rotary member 3 is rotated, the corresponding rod is urged so far in the outward direction that the pushing rod 42 carried by the sleeve 47 overlies the cylindrical portion 9. The portion 52a and the roller 41 are arranged generally at the same angular position which determines the location of the packing station so that the pushing rod 42, pushed forward by the portion 52a, is urged downward to apply a packing pressure to the content in the capsule body. The resulting space in the capsule body is filled by the secondary supply of medicine at the next filling station 16 (FIG. 1) which is similarly constructed as the first filling station 14. Subsequently powders attaching to the rim or outer edge of the capsule body are cleaned by a stationary brush 53 (FIG. 7) which constitutes the station 17 shown in FIG. 1. Now the capsule body is ready for being capped at the station 18.

Figure 8:
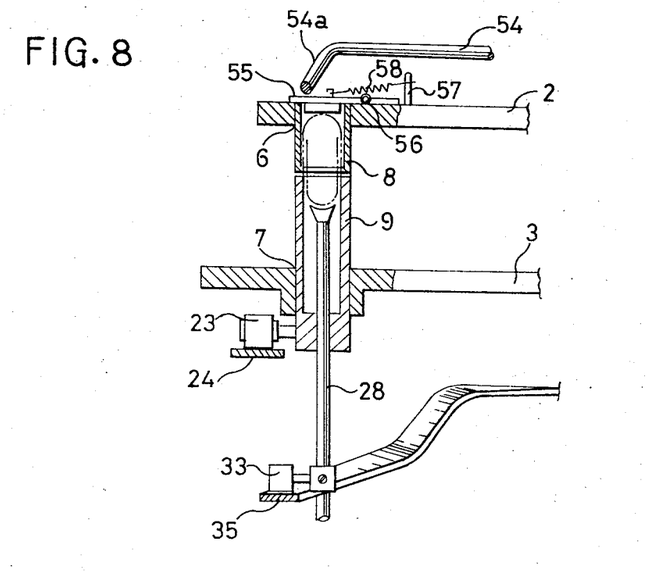
FIG. 8 is an elevation, partly in section, of a capping station.

Referring to FIGS. 1 and 8, a generally annular ring 54 is fixed above the upper rotary member 2. Adjacent each hole 6, a lid member 55 is pivotally mounted, or hinged at 56, to the rotary member 2 and a pin 57 is also fixed to the latter. A tension spring 58 secured to the pin 57 and the lid serves to keep the lid open or abutting against the ring 54 with its back (FIG. 3). The ring 54 has an outwardly and downwardly extending portion 54a which acts to urge the lid member 55 into a position shown in FIG. 8 in which it closes the hole 6 and prevents movement of the cap. Thus the capsule body may be moved upwardly by cooperation of the rollers 23 and 33 with the cam rails 24 and 25, respectively, to be unified with and closed by the cap.

Figure 9:
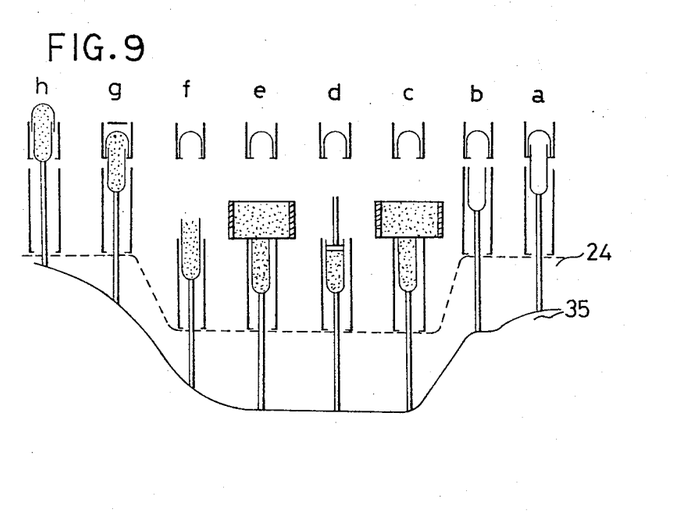

Referring to FIGS. 9a to h, there are shown profiles of the cam rails 24 and 35. FIG. 9a indicates the position of the cylindrical portion 9 at the capsule supplying station 10. Subsequently the the pipe 28 is gradually lowered and suction is applied thereto to release the capsule body from the cap (FIG. 9b). Then both the cylindrical portion 9 and the pipe 28 are substantially lowered to bring the capsule body into such a position that its upper edge lies flush with the upper surface of the lower rotary member 3 (FIG. 9c). The cylindrical portion 9 and the capsule body are maintained in this position until the packing operation (FIG. 9d), and the secondary filling (FIG. 9e) have been completed. Thereafter the pipe 28 begins to be raised, while the cylindrical portion 9 remains in its position shown in FIGS. 9c to 9e. During this phase, cleaning operation is performed by the brush 53 (FIG. 9f). Then the cylindrical portion 9 is restored to its original position shown in FIG. 9a, while the pipe 28 continues to be raised to unify the body with the cap (FIG. 9g). During further upward motion of the pipe 28 (FIG. 9h) the filled capsule complete with its cap may be pushed out of the cylindrical portion 8 at the delivery station 19 (FIG. 1). Alternatively, the removal of the charged capsule from the cylindrical portion ma may be effected by applying pneumatic pressure to to the pipe 28, thereby blowing off the capsule. This completes one cycle of operation of the system.

It should be obvious that various modifications can be made in the embodiment described above. For example, the suspension frame 11 (FIGS. 1 and 2) may be constructed as a ring from which cylinders 12 are suspended, the ring being turned, when a cylinder supplying the chute 10 is emptied, to replace it by full one. Although there has not been particularly described, a suitable arrangement may be made which automatically controls the supply of empty capsules from the cylinder 12 to the chute 10.

Figure 10:
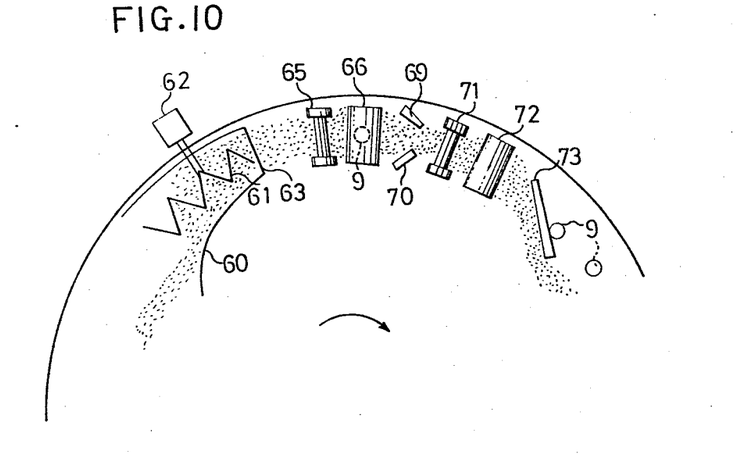
FIG. 10 is a plan view of the lower rotary member showing a modification of the medicine filling station.
Figure 11:
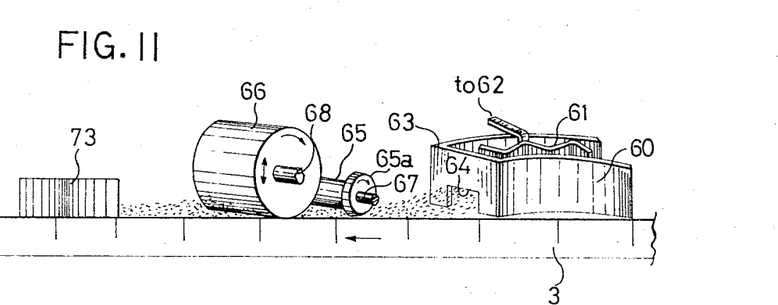
FIG. 11 is a perspective view of a part of the modified filling station shown in FIG. 10.

Furthermore, the packing and secondary filling operation can be achieved with a more simplified mechanism shown in FIGS. 10 and 11. FIG. 10 schematically shows the mechanism which may be used in place of the packing station 15 and the second filling station 16, of which construction has been shown in FIGS. 4 to 6. Specifically, the mechanism comprises a channel member or feeder 60 containing a zigzag plate 61 coupled to a vibrator 62. The feeder 60 is open at its trailing end as viewed in the direction of rotation of the rotary member 3, shown by an arrow in FIG. 10, and has an end plate 63 at its forward end, the end plate 63 having an opening 64 (FIG. 11) formed therein adjacent the rotary member 3. The feeder including the zigzag plate is arranged above the rotary member 3 with a small clearance therebetween so that it forms a path for powders entering the channel member at its trailing end. Powders leave the path at the opening 64 and pass under a pair of rolls 65 and 66 in turn which are supported and driven by shafts 67 and 68, these rolls being driven to have the same circumferential speed as the rotating speed of the rotary member 3. It will be seen from FIG. 11 that the roll 65 is raised from the surface of the member 3 relatively higher than the roll 66 so that powders are first lightly pressed by the roll 65 and then strongly pressed by the roll 66. The roll 65 has a pair of radially extending rims 65a at both ends so that powders coming under the roll 65 may be rolled without being spread laterally. One cylindrical portion 9 is shown under the roll 66 in broken lines, though a plurality of cylindrical portions 9 are provided along the periphery of the rotary member 3 as before, which, however, are omitted for clarity of the drawing. The capsule bodies received in these cylindrical portions 9 have contents filled up to their edges which are flush with the upper surface of the member 3 during when they are passing under the mechanism described. Therefore, the overlying powders will not be packed into the capsule body until the latter reaches under the roll 66, which forces additional powders into the capsule body that lies directly below it. The pressure with which the roll 66 presses powders into the underlying capsule body can be adjusted suitably by vertical positioning of the roll 66, as indicated by a both-ended arrow in FIG. 11. Powders leaving the roll 66 are guided by a pair of guide plates 69 and 70 mounted above the rotary member 3 in close proximity thereto. Sometimes it may be desirable to repeat the additional charging. This is achieved by another pair of rolls 71 and 72, similar to rolls 65 and 66, arranged ahead of the guide plates. In FIG. 10, another guide 73 is arranged in sliding contact with the rotary member 3 to thereby deflect powders inwardly. Thus the capsule bodies can be cleaned at the brushing station. In FIG. 10, it will be noted that the open trailing end of the feeder is enlarged so that its inner side lies nearer to the center of the rotary member 3 than at the forward end, thereby assuring return of powders into the channel path. The plate 61 undergoes forced vibration to break pressed blocks of powders into pieces. In addition, the feeder is adapted to be supplied with powders by suitable means (not shown) like the hopper 40 shown in FIG. 4.

Figure 12:
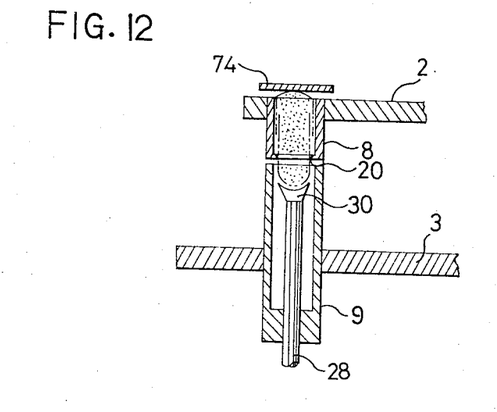
FIG. 12 is a sectional view showing a variation of the packing station.
Figure 13:
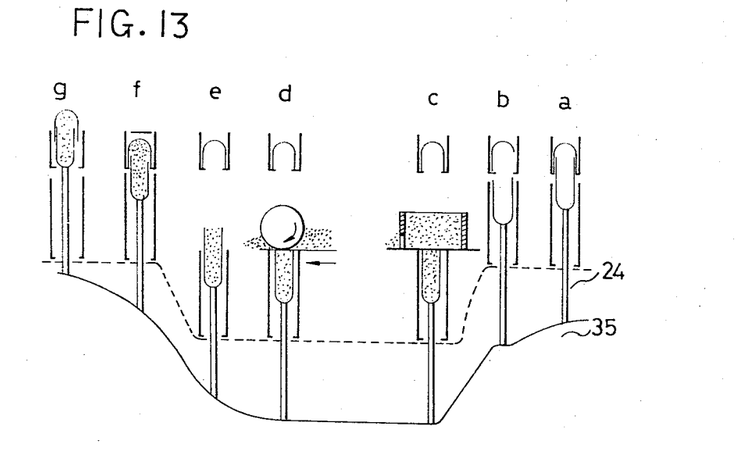

In FIG. 8, the capping station was constituted by the elements 54 to 58. However, this can also be simplified and replaced by a single member, that is, a lid 74 shown in 12 which is placed to cover the hole 6 of the upper rotary member 2 at a position where a capping operation should take place. FIGS. 13a to g illustrate sequence of operation when the packing station 15, the second filling station 16 and the capping station 18 of the first embodiment are replaced by the variations shown in FIGS. 10 to 12. Since the cycle of operation is similar to that in FIG. 9, it will not be particularly described.

Figure 14:
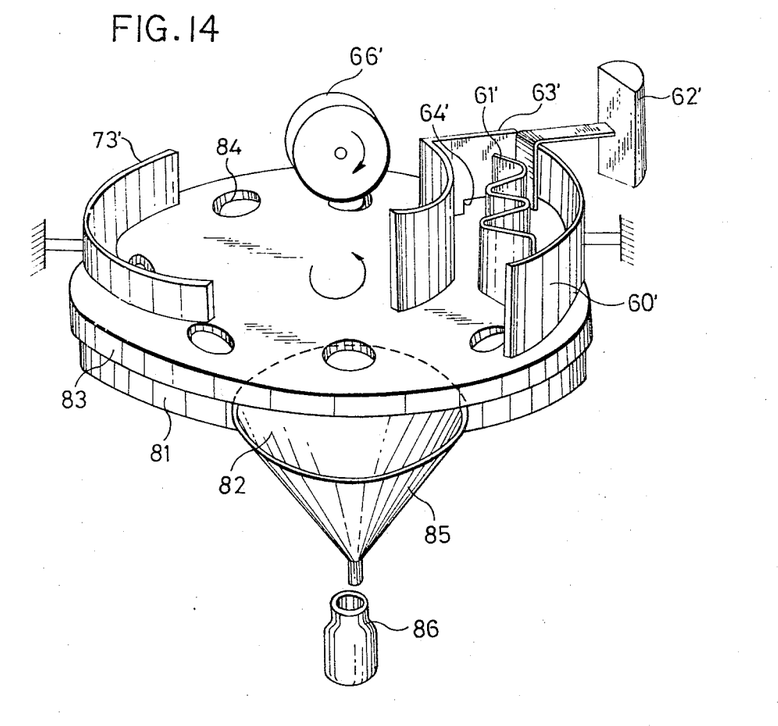
FIG. 14 is a perspective view of a filling device according to another embodiment of the invention.

Referring to FIG. 14, there is shown a filling device according to another embodiment of the invention, which may be used for subdividing a constant amount of powders, pills or granules of, for example, medicine or sweetening agent to be filled into a vial, for example. This filling device is much similar in construction to the device shown in FIGS. 10 and 11 so that like parts will be designated by same reference numerals with a prime. An annular plate 81 having a semicircular groove 82 at a part of its periphery is fixedly mounted on a suitable base (not shown). A disc 83 is placed on the plate 81 and is arranged to rotate about its axis as by a shaft attached to the underside of the disc and connected to an electric motor (not shown). The disc has a plurality of perforations 84 formed therein which are distributed equiangularly along the periphery of the disc 83. The perforations are uniformly formed so that they have a constant volume. Forwardly of the groove 82, as viewed in the direction of rotation of the disc 83 as shown by an arrow, there is provided a feeder or channel member 60' in close proximity to the disc. The feeder includes a zigzag plate 61' coupled with a vibrator 62'. An end plate 63 at the forward end of the feeder has a rectangular opening 64' formed centrally in its bottom, the opening 64' having a width equal to or greater than the diameter of the perforation 84. The feeder is arranged so that the opening aligns with the locus of the perforations 84. A roll 66' is rotatably arranged above the disc 83 with a small clearance therebetween which may be adjustable. The roll 66' lies on the circular locus of the perforations 84 and has a width greater than the diameter of the perforation. At an angular position between the roll 66' and the groove 82, there is arranged an arcuate guide 73' in sliding contact with the rotating disc 83. The forward end of the guide 73' is bent inwardly. The groove 82 must extend inwardly beyond a circle defined by the innermost rims of the perforations. As shown, the groove may receive a funnel 85 which lies above a vial 86, for example. It will be noted that the opening at the trailing end of the channel member 60' is somewhat enlarged.

In operation, the feeder is supplied with materials from a hopper such as that shown at 40 in FIG. 4. The vibrator 62' is set in motion so that the plate 61' is excited to stir powders in the feeder. Powders within the feeder are intercepted by the end plate 63', but rotation of the disc 83 carries away, through the opening 64', a layer of powders which has width and height determined by the dimension of the opening 64'. The roll 66' is rotated so that it has the same circumferential speed as the rotational speed of the disc 83. Thus the continuous layer of powders is pressed by the roll 66' into the perforation underlying the roll. It will be noted that since the disc 83 is rotated in sliding contact with the annular plate 81, the perforations 84 are closed at their bottom except when they move over the groove 82. After leaving under the roll, powders are led by the forward end of the guide 73' to be displaced inwardly and are returned to the feeder, where pressed blocks of powders are again stirred by the vibrating plate 61' to be broken to pieces. The forward end of the guide 73' serves simultaneously to scrape off any overlying or swelling portion of powders on the filled perforation, thus assuring to measure a constant amount of powders in each perforation. The resulting disc-shaped block in the perforation falls by gravity when it moves over the funnel 85 and is then charged into the vial 86.

While the invention has been described in connection with particular embodiments shown, it should be apparent that various modifications can be readily made by those skilled in the art without departing from the spirit of the invention.

We claim:

1. A device for subdividing a constant amount of pulverized materials, comprising a stationary base having a flat surface, a rotary disc placed on the flat surface, a drive for rotating the disc about its axis, a plurality of perforations provided in the disc equidistantly on a circle concentric therewith, a channel member arranged above a part of said circle in close proximity to the upper surface of said disc, said channel member having an end plate at its one end and being open at the other, a vibrating plate arranged within the channel member, means for transmitting vibrational motion to said vibrating plate, a hopper for supplying pulverized materials to the space within the channel member, said end plate having a port formed therein to allow passage of materials therethrough, said disc being rotated in a direction in which it is adapted to carry away materials in the channel member through said port in a bandlike form, a roll rotatably arranged above the circle and adapted to press the materials as carried by the disc into the perforations, an arcuate guide arranged between the roll and the other end of the channel member and having its end nearer to the other end of the channel member bent inwardly to cross said circle, whereby any amount of materials swelling above the upper surface of the disc is displaced inwardly from the annular area defined by the perforations, and a groove formed in the stationary base between said end of the arcuate guide and the other end of the channel member, said disc being rotated in sliding contact with the stationary base and said groove being of configuration to fully expose said perforation, whereby materials pressed into one perforation can be released from that perforation when the latter moves over the groove.